Feb. 9, 1960 V. F. FOSTER 2,924,798
WIRING FOR SLIDER OF POSITION MEASURING TRANSFORMER
Filed Nov. 23, 1956 3 Sheets-Sheet 1

VINCENT F. FOSTER,
INVENTOR.

BY *W E Beatty*

ATTORNEY.

Feb. 9, 1960 V. F. FOSTER 2,924,798
WIRING FOR SLIDER OF POSITION MEASURING TRANSFORMER
Filed Nov. 23, 1956 3 Sheets-Sheet 2

VINCENT F. FOSTER,
INVENTOR.

BY W E Beatty

ATTORNEY.

Feb. 9, 1960 V. F. FOSTER 2,924,798
WIRING FOR SLIDER OF POSITION MEASURING TRANSFORMER
Filed Nov. 23, 1956 3 Sheets-Sheet 3
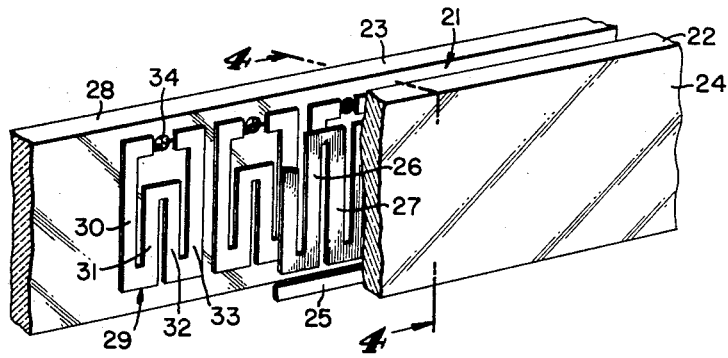
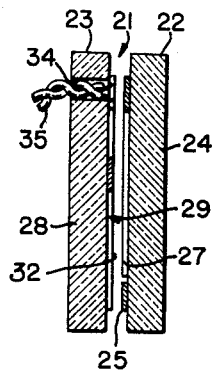
VINCENT F. FOSTER,
*INVENTOR.*
BY W E Beatty
ATTORNEY.

2,924,798
Patented Feb. 9, 1960

2,924,798
WIRING FOR SLIDER OF POSITION MEASURING TRANSFORMER

Vincent F. Foster, New Rochelle, N.Y., assignor to Inductosyn Corporation, Carson City, Nev., a corporation of Nevada Application November 23, 1956, Serial No. 624,057

5 Claims. (Cl. 336—115)

The invention relates to the wiring for the slider of a position measuring transformer and more particularly relates to reducing the capacity coupling between relatively moveable transformer members wherein one of the members is a scale having a continuous winding, the other member being the slider having quadrature windings. This type of transformer is described and claimed in application S.N. 509,168, filed May 18, 1955, by Tripp et al., for Position Measuring Transformer, now Patent No. 2,799,835, July 16, 1957, and assigned to the assignee of the present application. The prior patent describes and claims a transformer wherein each of its members comprises an insulating support having thereon a winding wherein the conductors extend transversely to the direction of relative movement of the members. Such transformers may be employed for the general purposes for which resolvers are used. As disclosed in the prior patent application, the transformer of this invention preferably has an air core and a series arrangement of conductors having one pole per conductor. As disclosed and claimed in the prior patent application, one turn loop coupling may be avoided or reduced by arranging the spacing and the connection of the conductors so that the current flow in one-half of the conductor groups is in a direction lengthwise of the support opposite to the direction of current flow of the remaining groups. That application, however, discloses an arrangement wherein eight conductor groups are connected together in sequence in the same order as their physical arrangement on the support whereby the conductor group at one end of the arrangement is connected to a terminal at one end of the current path, the conductor group at the other end of the arrangement being connected to the other terminal by a connecting lead which extends lengthwise of the group. It has been found that this results in an unwanted capacity coupling between the two quadrature windings of one transformer member and the continuous winding of the other member. As the functioning of this type of device depends upon magnetic coupling, it is desirable to maintain a favorable ratio of magnetic coupling to capacity coupling and the present invention is an improvement in reducing the amount of this capacity coupling.

According to the invention, the unwanted capacity is reduced in the same way for each of the quadrature windings, connectors being provided for connecting a portion of the conductor groups of the winding for current flow in one general direction along its support, with other connectors for connecting the remaining conductor groups of the winding for current flow in the opposite direction along its support, the winding having terminal connectors which are connected to adjacent ones of the conductor groups of its winding. More particularly, an even number of conductor groups is provided for each of the quadrature windings, adjacent ones of the conductor groups of each winding being at the opposite ends of the current path, and the conductor groups which are physically adjacent are connected at opposite relative positions of the current path.

For further details of the invention, reference may be made to the drawings wherein, Fig. 1 is an exploded plan view of the wiring of the quadrature windings of a slider according to the prior patent application referred to above, the single conductor transformer member not being shown, the arrows representing the direction of current flow and the phantom lines representing the conductor groups of the alternate winding, both windings being actually interlaced on the same glass or insulating support.

Fig. 3 is a perspective view of the relatively moveable transformer members, the rear one of which is shown on Figs. 1 and 2.

Fig. 4 is a sectional view of line 4—4 in Fig. 3.

Figure 1:
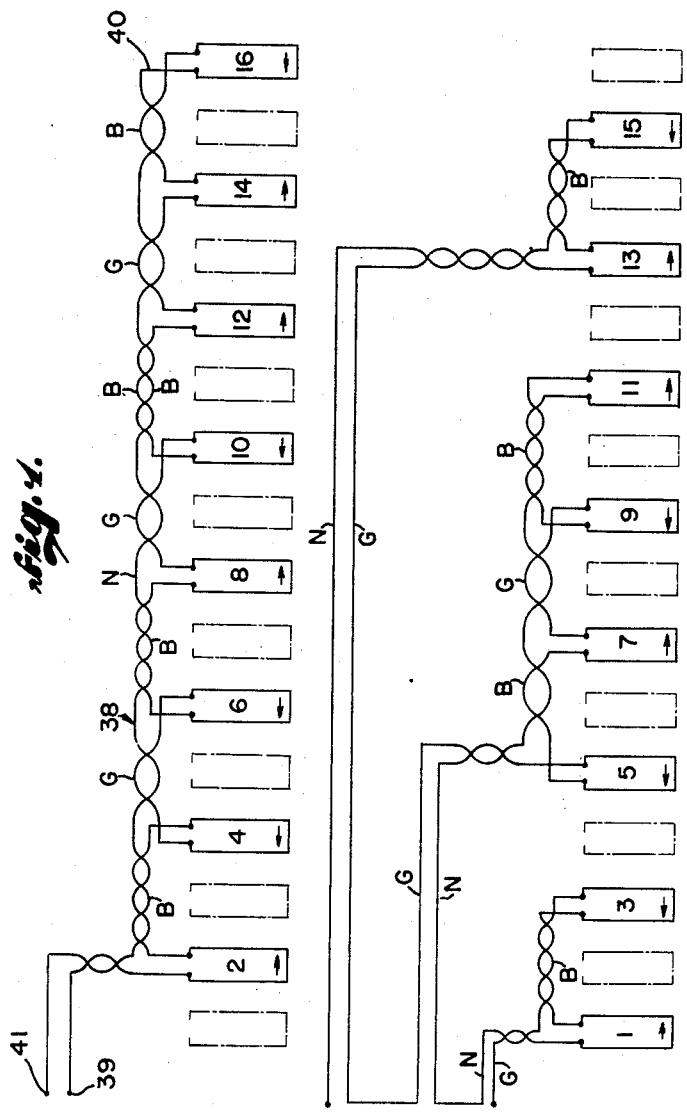
Figure 2:
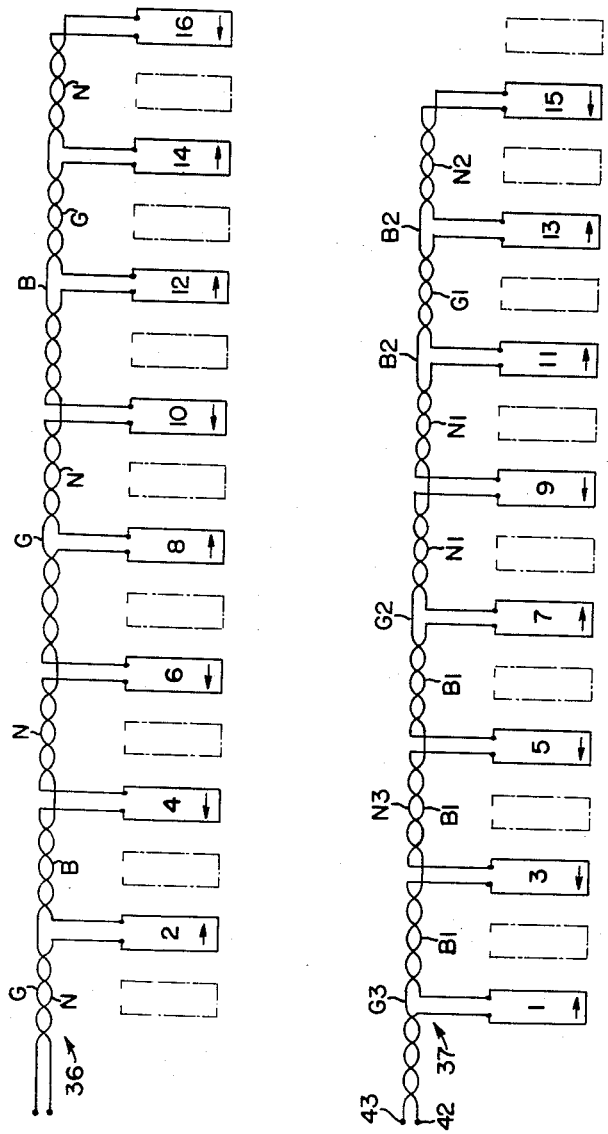
Fig. 2 is a view corresponding to Fig. 1 wherein the connections for the conductor groups are changed so as to reduce the capacity between the windings shown and the single conductor transformer member not shown.

Referring in detail to the drawings, the transformer 21 in Fig. 3 comprises the relatively movable members 22 and 23 of which the member 23 is a slider and shown in Figs. 1 and 2. The member 22 is referred to as a scale and has an insulating support 24 for a single conductor 25 deposited thereon comprising a winding having conductors like 26 and 27 connected in series and arranged transversely of the direction of relative movement of the members 23 and 22. The slider 23 also has an insulating support 28 having deposited thereon groups of conductors, each group being somewhat in the shape of a W as indicated at 29 and each such group being represented by a U as indicated for each of the odd and even numbered groups 1 to 16 in Figs. 1 and 2. Each group 29 has parallel conductor portions 30, 31, 32 and 33 connected in series at adjacent ends on the support, these conductors being arranged parallel to the conductors 26 and 27 transversely of the direction of movement of slider 23. The transformer 21 has an air core, with one conductor per pole, the showing in Fig. 3 being somewhat exaggerated as the distance from one conductor to the next conductor on each of the members of the order of 1/20".

The support 28 has a series of holes as shown at 34 through which extend connectors 35 connected to the outer ends of the conductors like 30 and 33 of a group.

As shown in Figs. 1 and 2, there are provided a total of 16 groups of conductors like the one indicated at 29 in Fig. 3, the even numbered groups being connected in series to form one quadrature winding and the odd numbered groups being connected in series to form the other quadrature winding. As disclosed in the above mentioned prior patent application, the quadrature relation of the windings and the direction of current flow shown by the arrows is obtained by connecting the groups as shown and using a spacing of 4.5 poles from the centers of groups 1 and 2, 2 and 3, 3 and 4, a spacing of 5.5 poles from the center of group 4 to center of group 5, a spacing of 4.5 poles from 5 to 6, 6 to 7, 7 to 8, 8 to 9, 9 to 10, 10 to 11, 11 to 12, a spacing of 5.5 poles from center of group 12 to the center of group 13 and a spacing of 4.5 poles from 13 to 14, 14 to 15, and from 15 to 16. This description applies to both Figs. 1 and 2 herein. Fig. 1 shows the lower winding divided into three sections which is unnecessary for the purposes of the present invention, both of the windings indicated at 36 and 37 in Fig. 2 being the same. Heretofore, as shown for the upper winding 38 in Fig. 1, it will be seen that the terminal 39 is connected to one end of the current path at the left side of group 2 and that the current path then proceeds with the even numbered groups connected in sequence in the same order as their array on the support, the lead 40 from the left side of group 16 at the other end of the current path extending lengthwise of all of these groups and forming the terminal 41, with the result that there is a static potential and substantial capacity between the winding 38 and the winding like 25 on its associated transformer member like the scale 22 in Fig. 3. According to the invention, this static potential and capacity are reduced in the same way for each of the windings 36 and 37 in Fig. 2 and will be described in connection with winding 37. Following the current path from terminal 42 connected to the left end of conductor group 1, the path proceeds by the conductor marked B1 to the conductor group 7 and then through the conductor marked N1 through the conductor group marked 11 and from conductor marked G1 to conductor group 13, then by conductor N2, to conductor group 15, then by conductor B2 to conductor group 9, then by conductor G2 to conductor group 5, and then by conductor N3 to group 3, and then by conductor G3 to the other terminal 43. In other words, in the old connection shown in Fig. 1, the sequence was 1, 3, 5, 7, 9, 11, 13 and 15 whereas in the new wiring of Fig. 2, the sequence is 1, 7, 11, 13, 15, 9, 5, 3. The new arrangement gives a balance of the static potential, as the various pairs of conductor groups, while physically adjacent on the support, are in electrically opposite relative positions, as group 1 in tracing out the above path was the first one in the path while physically adjacent group 3 was the last one. In a similar way, the group 7 is next to the first while 5 is next to the last, both 7 and 5 being again physically adjacent. In a similar way, groups 9 and 11 are physically adjacent, yet they are again electrically in relative opposite positions. Groups 13 and 15, being at the center, again obey this rule. While maintaining reduction of one turn loop coupling as above described, this wiring arrangement of Fig. 2 results in scrambling the conductor groups in a different order than the order of their arrangement on their insulating support whereby the current conductor groups which carry current in one direction are at opposite relative positions of the current path with respect to the conductor groups carrying current in the opposite direction. The physically adjacent conductor groups of each quadrature winding are at opposite positions in their order of electrical connection, with the conductor groups of each winding having first and second physical positions being wired first and last in the winding, the third and fourth being wired second and next to last, etc. A potential balance is obtained as the current path proceeds from the left end of the quadrature winding pattern directly, that is without reversal, to the right end and then reverses direction only at the right end of the pattern, proceeding again without reversal, back to the left end again, so that the start and finish of the current path are at left end of the winding while the middle of the current path is at the opposite or right end.

In Figs. 1 and 2, the notations B, G and N represent different wire colors, for the different wires, such as brown, green and natural respectively, these wires as indicated being tightly twisted and No. 29 Formax wire, or other suitable wire.

Various modifications may be made in the invention without departing from the spirit of the following claims.

I claim:

1. A transformer comprising relatively movable inductively related primary and secondary members, one of said members having an insulating support having thereon a winding having conductors connected in series for current flow in opposite directions transversely of the direction of said relative movement and having one conductor per pole and a pole cycle of two poles, the other of said members having an insulating support having thereon two windings arranged in space quadrature of said pole cycle, each of said quadrature windings having a plurality of conductor groups each having conductors connected at adjacent ends in series for current flow in opposite directions transversely of said direction of relative movement and means for reducing the capacity coupling between the winding of one of said members and the quadrature windings of the other member, said means comprising separate end connectors for connecting a portion of the conductor groups of each of said quadrature windings for current flow in a path in one general direction along its support and other connectors for separately connecting the remaining conductor groups of each of said quadrature windings for current flow in the said connectors for the conductor groups of each quadrature winding providing a current path which proceeds from one end of the winding without reversal of direction to the other end of the winding and then reversing direction only at said other end of the winding and back to the said one end of the winding, with the start and finish of the current path for each quadrature winding at said one end of the winding and with the middle of the current path at said other end of the winding.

2. A transformer comprising relatively movable inductively related primary and secondary members, one of said members having an insulating support having thereon a winding having conductors connected in series for current flow in opposite directions transversely of the direction of said relative movement and having one conductor per pole and a pole cycle of two poles, the other of said members having an insulating support having thereon two windings arranged in space quadrature of said pole cycle, each of said quadrature windings having a plurality of conductor groups each having conductors connected at adjacent ends in series for current flow in opposite directions transversely of said direction of relative movement and means for reducing the capacity coupling between the winding of one of said members and the quadrature windings of the other member, said means comprising separate end connectors for connecting a portion of the conductor groups of each of said quadrature windings for current flow in a path in one general direction along its support and other connectors for separately connecting the remaining conductor groups of each of said quadrature windings for current flow in the opposite direction along said path, the physically adjacent conductor groups of each quadrature winding being at opposite positions in their order of connection, with the conductor groups of each winding which have the first and second physical positions being electrically first and last in the winding, the conductor groups having the third and fourth physical positions in the winding being electrically second and next to last in the winding, with a similar relation between the physical position and the electrical order for the remainder of the conductor groups of each winding.

3. A transformer member comprising an insulating support having a winding comprising a plurality of groups of parallel conductors having end connections for current flow in opposite directions in the conductors of a group, said groups being arranged physically on said support in one consecutive order and connectors connecting said groups electrically in series in another order, said connectors providing a potential balance for said conductor groups with physically adjacent ones of said conductor groups at opposite positions in their order of electrical connection in said winding.

4. A transformer member according to claim 3, said conductor groups being eight in number and having physical positions in the order 1, 3, 5, 7, 9, 11, 13 and 15, said connectors connecting said groups electrically in the order 1, 7, 11, 13, 15, 9, 5, 3.

5. A transformer member comprising an insulating support having a winding comprising a plurality of groups of parallel conductors having end connections for current flow in opposite directions in the conductors of a group, said groups being arranged physically on said support in one consecutive order and connectors connecting said groups electrically in series in another order, said connectors providing a potential balance for said conductor groups with the current path through said groups proceeding from one end of said winding without reversal of direction to the other end of the winding, and then reversing direction only at said other end and proceeding without reversal to said one end, with the start and finish of the said current path at said one end of the winding and with the middle of said current path at said other end of said winding.

References Cited in the file of this patent
UNITED STATES PATENTS 2,685,070    Childs _____ July 27, 1954
2,799,835    Tripp _____ July 16, 1957